April 2, 1963  A. J. DE MOUDE  3,083,974
SEAL
Filed Feb. 1, 1960
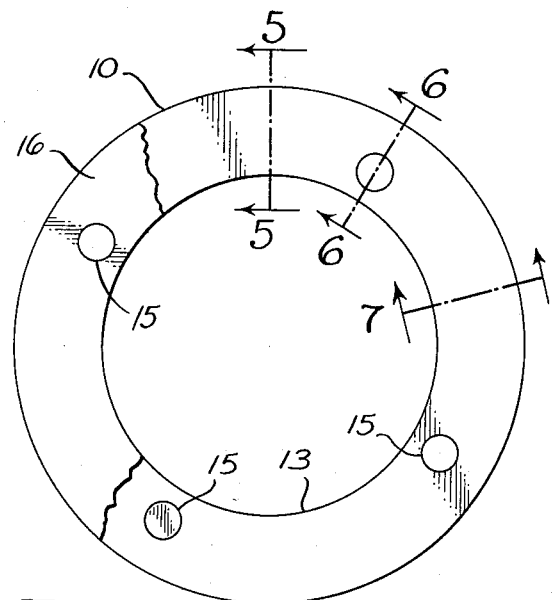
Fig. 1.
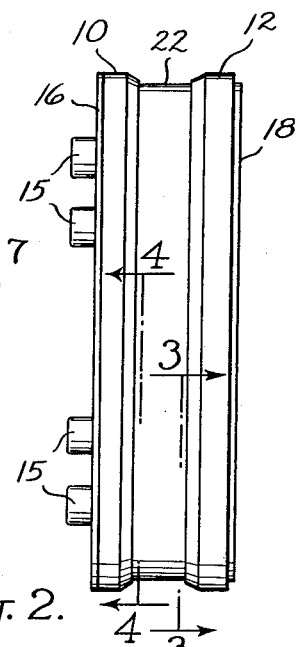
Fig. 2.
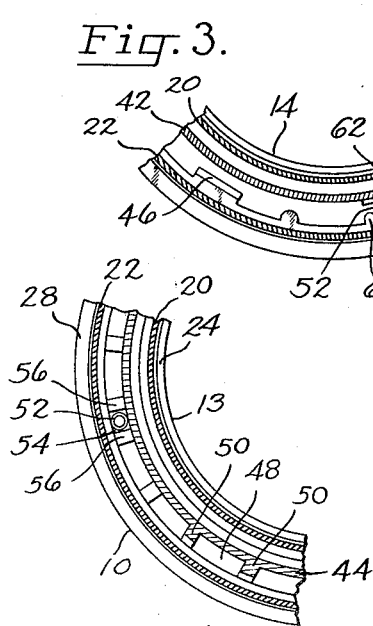
Fig. 3.
Fig. 4.
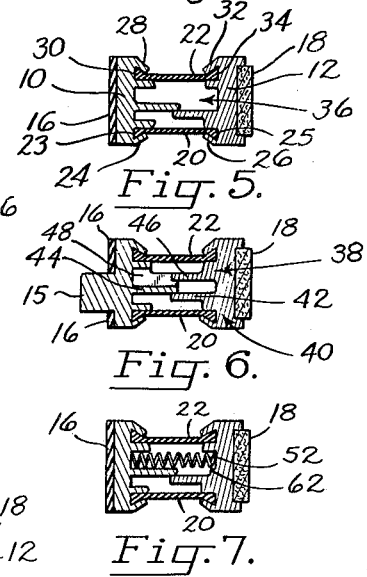
Fig. 5.
Fig. 6.
Fig. 7.
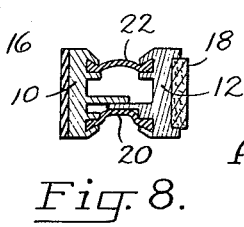
Fig. 8.
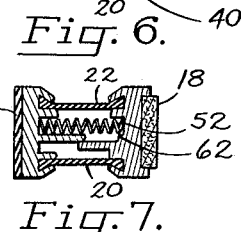
Adrian J. DeMoude
INVENTOR.
BY Ramsey and Kolisch
Attys.

3,083,974
SEAL
Adrian J. De Meude, P.O. Box 392, Beaverton, Oreg.
Filed Feb. 1, 1960, Ser. No. 5,999
3 Claims. (Cl. 277—36)

This invention relates to seals, and more particularly to a bearing seal for a shaft extending between a pair of members spaced axially on the shaft.

Seals of this description, for example, end thrust seals, are installed to perform a function of maintaining grease, oil, or other lubricant about the shaft and excluding from the shaft foreign matter, such as dust, water, etc. The usual seal includes axially spaced end plates, where provision is made for relative axial movement of the plates, and sealing means connecting the plates. Such sealing means are prone to early rupture and failure in known types of seals. A general object of this invention, therefore, is to provide an improved seal construction, wherein leakage between the end plates, either into or out of the seal, is effectively prevented over a long period of time under the severest of operating conditions.

An expedient known in the art to which this invention relates is to provide a flexible diaphragm connecting the perimeters of the end plates of a bearing seal. While such a diaphragm initially is effective to seal the plates together, the life of the bearing seal is somewhat limited. Lubricant has a tendency to collect in the space surrounded by the seal, and this lubricant, particularly when the end plates are forced axially toward each other, produces a radially outward pressure on the diaphragm. This outward pressure results in either rupture of the diaphragm or its separation from either one or the other of the end plates, which means replacement of the entire seal.

Thus it is an object of the invention to provide a seal construction wherein a diaphragm is present that functions primarily as a sealing member and without having to contain any pressures produced by a confined lubricant.

More specifically, it is an object of the invention to provide a seal comprising a pair of annular end plates spaced axially from each other that includes a diaphragm connecting the plates to seal off the space between them, and, support means positioned radially outwardly of the diaphragm and substantially surrounding it providing a rigid backing for the diaphragm and preventing its radial extension.

A feature of the invention is the provision as the supporting means for the diaphragm, of a pair of concentric, annular flanges disposed radially outwardly of the diaphagm. The flanges provide expansive smooth surfaces for supporting the outer side of the diaphragm with the end plates shifted axially either toward or away from each other.

In the usual end thrust seal, provision is made for preventing relative rotary movement of the end plates, while accommodating axial shifting of the plates. It is another and more specific object of this invention to provide a seal construction which comprises a pair of concentric diaphragms, each joined at opposite ends to the end plates, defining an annular chamber, wherein the walls of this chamber enclose a support for the inner of the diaphragms (this diaphragm being the one confining lubricant) and also enclose the structure preventing relative rotation of the end plates. The outer diaphragm in the organization prevents the ingress of dirt and foreign matter into the mechanism of the seal.

A still further object is to provide a seal construction wherein the mechanism preventing relative rotary movement of the end plates is defined partially by the flange structure providing the support for the inner diaphragm.

A still further object is to provide a seal construction of the type described capable of mass production at relatively small unit cost.

Other advantages and objects are attained by the invention, the same being described hereinbelow, in conjunction with the accompanying drawings wherein:

FIG. 1 is a view of one end of the seal;

FIG. 2 is a side view of the seal;

FIGS. 3 and 4 are section views along the lines 3—3 and 4—4 in FIG. 2, respectively;

FIGS. 5, 6 and 7 are sectional views along the lines 5—5, 6—6, and 7—7 in FIG. 1, respectively; and FIG. 8 is a view similar to FIG. 5 but showing the seal plates moved axially toward each other.

Referring now to the drawings, in the embodiment illustrated 10 and 12 indicate a pair opposed end plates or annular members of an end thrust, bearing seal. These are spaced axially from each other. In the ordinary installation where the seal surrounds a shaft (not shown) extending between axially separated and relatively rotatable members (not shown), the end plates are fitted snugly between the axially separated members with the shaft extending through center openings 13, 14 of the end plates.

End plate 10 is provided with lugs 15 equally circumferentially spaced about its outer face. These are used to fix the plate from rotation relative to one of the axially separated members. A sealing ring 16 is fitted over the outer face of end plate 10, such ring having suitable apertures for the insertion of lugs 14 therethrough. Ring 16 provides a means for producing a fluid-tight seal with the end plate.

The other of the end plates 12 has secured over its outer face a ring of packing material 18. In an installation, packing material 18 is forced tightly against the other of the axially separated members, and provides a fluid-tight seal with this other member.

Extending axially and in the space between the two end plates are a pair of concentric, tubular diaphragms 20, 22. These are made of leather, rubber, a synthetic, or other suitable flexible material. The diaphragms are joined at their ends to opposed end plates 10 and 12. Thus, and referring to FIG. 5, the radially inner of the diaphragms 20 may be fastened to end plate 10 by first fitting one end into a groove 23 of plate 10 and then turning over a flange 24 to produce a tight grip on the end. Similarly, the other end of the diaphragm may be fastened in place by means of a groove 25 of end plate 12 and a flange 26 similar to flange 24. In like manner, the radially outer of the diaphragms 22 is secured to end plate 10 through flange 28 and groove 30, and to plate 12 using flange 32 and groove 34. The concentric diaphragms and the end plates together define an annular chamber, indicated generally at 36, disposed between the end plates.

Within annular chamber 36 is mechanism indicated generally at 38 inhibiting relative rotation of the end plates (while accommodating axial of the plates) and support structure generally shown at 40 providing a rigid backing for the inner of the diaphragms 20, whereby the diaphragm is restrained from radial extension.

Specifically, support structure 40 comprises a pair of concentric, snugly interfitting, and axially extending flanges 42, 44. Flange 42 is integral with end plate 12 and flange 44 is integral with end plate 10. These flanges overlap, with the end plates moved relatively close together as shown in FIG. 8, and with the end plates separated axially to their greatest extent, as shown in FIGS. 5, 6, and 7. The flanges have smooth and expansive inner surfaces, and in all positions of the end plates provide a rigid and encompassing support for diaphragm 20 preventing undue radial extension of the diaphragm.

Mechanism 38 takes the form of equally circumferentially spaced projections or fingers 46 integral with end plate 12 that project axially toward the other of the end plates 10. These fingers are received within pockets 48 presented by end plate 10. Pockets 48 are defined partially by the outer flange 44 and partially by pairs of radial ribs 50 integral with outer of flange 44. The construction described enables the rigidity of flange 44 to be used in supporting the pockets. Fingers 46 can shift axially of the pockets on relative axial movement of the end plates, while locking the plates from relative rotary movement.

Completing the description of the seal, coil springs 52 interposed between the end plates function to urge them axially apart. These springs have one set of ends seating within recesses 54 defined by lug portions 56 of end plate 10, and their other set of ends seating within recesses 58 defined by lug portions 60. Shoulders 62 assist in portioning these other ends of the springs.

In operation of the seal, relative axial shifting of the end plates is accompanied by flexing of the diaphragms, somewhat in the manner indicated by comparing FIGS. 5 and 8. The inner of the diaphragms, which seals lubricant about a shaft, is supported and confined by the concentric flanges 42, 44. Thus this inner diaphragm is freed from containing liquid pressures. The outer of the diaphragms, since it is subjected to no appreciable radial pressures, need not be constrained. The function of the outer diaphragm primarily is to close off the relatively axially shiftable mechanism of the seal from any foreign matter carried in the air surrounding the seal.

It is claimed and desired to secure by Letters Patent:

1. A seal comprising a pair of opposed and axially spaced annular members, a radially inner and a radially outer tubular diaphragm concentrically arranged and extending in an axial direction between the annular members, means joining the ends of each diaphragm to each of the annular members, said diaphragms and annular members defining an annular chamber between the members, means within said chamber securing the annular members from relative rotation, but accommodating relative axial movement, and backing structure for the inner diaphragm integral with at least one of the annular members and disposed in said chamber and operable to limit radially outward extension of said inner diaphragm.

2. An end thrust seal comprising a pair of opposed and axially spaced annular members, an axially extending diaphragm between the annular members secured at its ends to each and adjacent the inner circumference of each, a pair of interfitting concentric flanges, one integral with one member and one integral with the other member, projecting axially toward each other in the space between the members and disposed radially outwardly of said diaphragm, said flanges providing a support means limiting radially outward extension of the diaphragm, means disposed radially outwardly of the concentric flanges inhibiting relative rotary movement of the annular members, and a second diaphragm concentric with the first disposed radially outwardly of said last-mentioned means and connected at each end to each of the members, respectively.

3. An end thrust seal comprising a pair of opposed and axially spaced annular members, a radially inner and a radially outer tubular diaphragm, concentrically disposed, and extending axially between the members and each joined at each of its ends to each of the members, respectively, said diaphragms and annular members defining an annular chamber between the members, a pair of interfitting and axially extending concentric flanges within said chamber, one integral with one of the members and one integral with the other, disposed radially outwardly of the radially inner diaphragm and directly therebehind, said interfitting flanges providing a support means for limiting extension in a radial direction of the radially inner diaphragm, plural paired ribs integral with the outer of the flanges defining with the flange a series of pockets, the paired ribs being circumferentially spaced about the outer flange, and means integral with the annular member having the inner flange fitting within said pockets for preventing relative rotary movement of the annular members but accommodating relative axial movement.

References Cited in the file of this patent

UNITED STATES PATENTS

| | | |
|---|---|---|
| 2,508,097 | Brown | May 16, 1950 |
| 2,694,588 | Wooden | Nov. 16, 1954 |
| 2,814,512 | Quinn et al. | Nov. 26, 1957 |